United States Patent Office 3,459,400
Patented Aug. 5, 1969

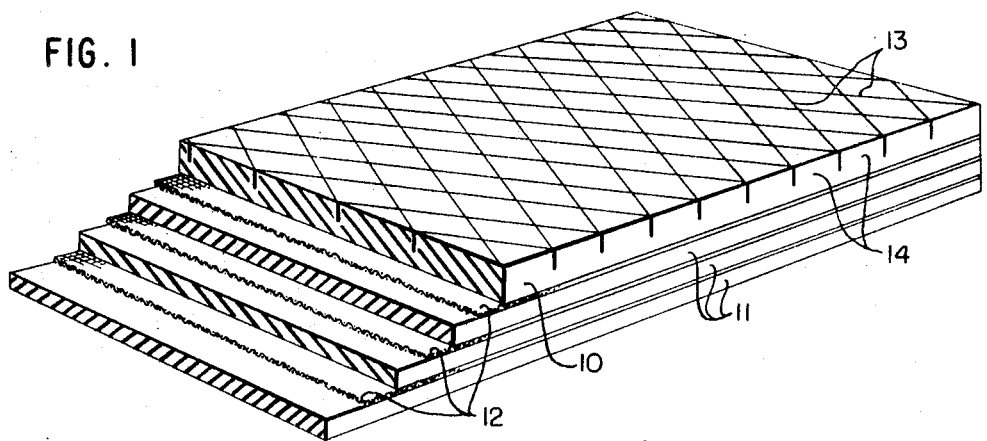
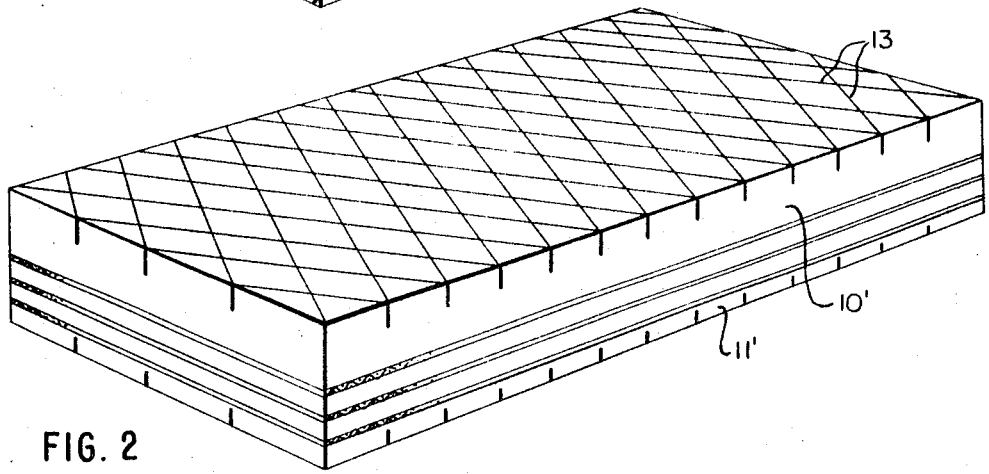
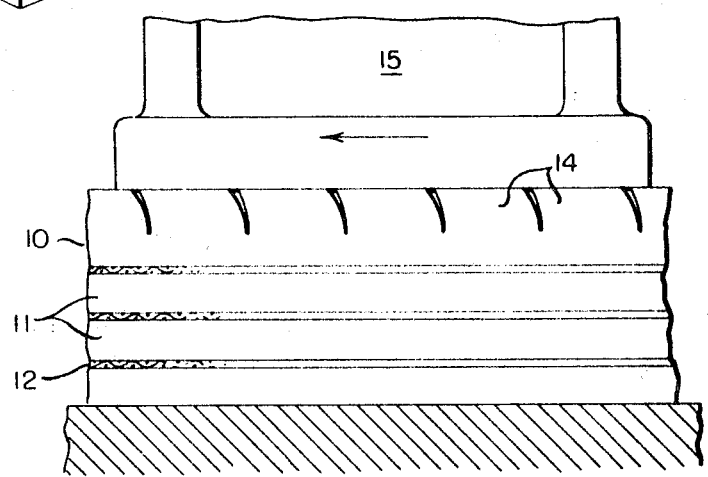

3,459,400
VIBRATION DAMPING PAD
Edward M. Rothermel, Winchester, Mass., assignor to American Biltrite Rubber Co., Inc., Chelsea, Mass., a corporation of Delaware
Filed Dec. 20, 1966, Ser. No. 603,290
Int. Cl. F16f *15/04;* E02d *27/44*
U.S. Cl. 248—358    1 Claim

ABSTRACT OF THE DISCLOSURE

A vibration damping pad comprising laminated plies of rubber and fabric permanently united between external plies of rubber, one at least of said external plies being provided in its exposed outer face with a pattern of siping cuts defining a multiplicity of tongues yieldingly movable transversely in the surface of the pad.

---

This invention relates to the field of laminated elastomeric packing or pads for use in damping, absorbing or cushioning vibration in machinery or impact in operating machine parts. Serious difficulty has been encountered in eliminating a tendency to migrate or bodily travel in machines driven in a rhythmic cycle. Vibrations are also sometimes set up within a machine itself that interfere with the handling of loose supplies such as tacks, eyelets or thread. Such vibrations also set up unpleasant acoustic effects transmitted to a factory floor and walls.

The present invention is based upon my discovery of the unexpected and unpredictable damping effect of a pad having an external ply of elastomeric material presenting an exposed surface which is smooth in itself but penetrated by spaced siping cuts or slashes defining a multiplicity of contiguous tongues of small cross section. These tongues appear to be yieldingly movable transversely in group formation in the surface of the pad. They yield in response to external incident pressure of a vibrating contact or impact but absorb the vibration without transmitting it as emergent energy. In forming these tongues no material of the top ply is removed so that the exposed surface remains smooth and without open cavities.

The characteristics of my novel vibration damping pad will be best understood and appreciated from the following description of preferred embodiments thereof, selected for purposes of illustration and shown in the accompanying drawings, in which—

FIG. 1 is a view in perspective, partly in section, of a pad having a single siped surface, FIG. 2 is a view in perspective of a pad having a siped pattern on both surfaces, and FIG. 3 is a fragmentary diagrammatic view on an enlarged scale.

The pad shown in FIGS. 1 and 3 is laminated of alternate plies of rubber or other elastomeric material and plies of fabric of canvas, nylon or suitable synthetic resinous compound.

The upper ply 10 may be calendered to a thickness of one quarter inch or thereabout. With this facing ply are combined three plies 11 of the same elastomeric material but of substantially less thickness. These are interleaved with fabric plies 12, all being united and cured in a thick unitary sheet and cut to convenient size for intended use.

The upper or facing ply 10 is shown as provided with a herringbone pattern of siping cuts or slashes 13 and these define a multiplicity of small contiguous diamond-shaped tongues 14 about one-sixteenth inch in depth.

In FIG. 3 the pad is shown as supporting the base or frame 15 of a machine operating in a cycle that imparts a lateral vibration to the whole machine. This incident vibration is damped and absorbed in passing into the pad, presumably because the tongues 14 are free to move as a group yieldingly out of their initial position with a constant bias to return thereto. The tongues are also adapted for yielding in lengthwise compression in case of vertically oriented vibration.

A pad of somewhat modified construction is shown in FIG. 2 in that it has a bottom or underlying ply 11' of elastomeric compound which, in addition to its facing ply 10', is provided with a herringbone pattern of siping cuts. This construction somewhat augments the damping reaction of the facing ply and renders the pad more sensitive to high speed, short wave vibrations.

The precise composition of the layer 10 is of secondary importance so long as it is tough, resilient and elastic. Any one of a number of oil-resistant compounds based on natural rubber or synthetic resins may be successfully used. A typical compound based on natural rubber is compounded as follows—

| | |
|---|---:|
| Smoked sheets | 38.00 |
| Zinc oxide | 2.00 |
| Titanium dioxide | 5.00 |
| Yellow oxide of iron | 2.50 |
| Red oxide of iron | .15 |
| Stearic acid | .75 |
| Sulfur | 1.50 |
| Altax | .75 |
| D.P.G. | .25 |
| Antioxidant | .75 |
| High grade whiting | 48.35 |
| | 100.00 |

As an example of resinous elastomeric material suitable for the plies 10 and 11 Adiprene will serve. This is a polyurethane compound containing a component of the isocyanate group. However any polyester type resin having similar characteristics of toughness and flexibility may be employed.

Having thus disclosed my invention and described an illustrative embodiment thereof I claim as new and desire to secure by Letters Patent is:

1. A laminated vibration damping pad having top and bottom rubber plies presenting outer surfaces which are smooth in themselves but penetrated by spaced intersecting siping cuts disposed in herringbone pattern and defining a multiplicity of small contiguous tongues yieldingly movable transversely in the said surfaces and normally in contact with each other thereby eliminating open cavities in the exposed surfaces of the pad.

References Cited

UNITED STATES PATENTS

| | | | |
|---:|---|---|---|
| 348,782 | 9/1886 | Sawyer | 248—350 X |
| 2,724,670 | 11/1955 | Mason | 248—22 X |
| 2,809,145 | 10/1957 | McDermott | 248—22 X |
| 2,821,391 | 1/1958 | Buccicone | 248—350 X |
| 2,854,230 | 9/1958 | Jones | 248—22 X |
| 2,920,884 | 1/1960 | Rowland | 248—22 X |
| 1,452,099 | 4/1923 | Sipe | 152—209 |
| 2,152,883 | 4/1939 | Eudy | 152—209 |

CHANCELLOR E. HARRIS, Primary Examiner

U.S. Cl. X.R.

248—22